UNITED STATES PATENT OFFICE.

CHARLES BLACKING, OF BUFFALO, NEW YORK, ASSIGNOR OF ONE-HALF TO W. P. CLOTWORTHY, OF BALTIMORE, MARYLAND.

BAKING-POWDER.

SPECIFICATION forming part of Letters Patent No. 307,426, dated November 4, 1884.

Application filed August 13, 1883. (No specimens.)

*To all whom it may concern:*

Be it known that I, CHARLES BLACKING, of Buffalo, in the county of Erie and State of New York, have invented certain new and useful Improvements in Baking-Powders; and I do hereby declare that the following description of my said invention forms a full, clear, and exact specification, which will enable others skilled in the art to which it appertains to make and use the same.

My present invention has general reference to the production of an efficient, serviceable, palatable, and healthful baking-powder; and it consists in the new and improved compound, all as hereinafter first fully set forth and described, and then pointed out in the claim.

Heretofore baking-powders have been compounded chiefly with cream-tartar as a component part, such cream-tartar being, as far as I am aware, the only tartrate ever employed in baking-powders.

My invention consists in a baking-powder composed of an aluminium ammonium tartrate in combination with an alkaline carbonate. The atomic composition of the said aluminium salt is expressed by the formula $Al_2(NH_4)_2(C_4H_4O_6)_4$, and is produced as follows: one equivalent of hydrate of aluminium, three equivalents of tartaric acid, and one equivalent of tartrate of ammonium; or by the equivalent formula: one equivalent of hydrate of aluminium, two equivalents of tartaric acid, and one equivalent of bitartrate of ammonium, either of which will produce the crystals of aluminium ammonium tartrate heretofore described.

In compounding a baking-powder I prefer to use 7 (seven) parts, by weight, of aluminium ammonium tartrate, 5 (five) parts, by weight, of bicarbonate of soda, and 6 (six) parts of corn-starch or other amylaceous substance, and use of this compound 2 (two) tea-spoonfuls, more or less, with 1 (one) quart of flour.

The resultant salts produced by the reaction of the above compound when heated are tartrate of aluminium and tartrate of sodium, both of which are readily digested and perfectly harmless to the human system.

It will now be readily observed that in the cream-of-tartar baking-powders heretofore made one-half of the tartaric acid is lost, while in my present baking-powder three parts of the four of tartaric acid are used, thus producing a saving of nearly one-half of the tartaric acid that was formerly lost. It will be further observed that the production of tartaric acid is limited, owing to the fact that its source of supply yields only a fixed quantity, and that with the increased demand for this salt its cost increases, so as to finally bring it beyond the reach of baking-powder manufacturers. It is therefore obvious that my present invention, tending to utilize part of the acid that was formerly lost, will have a beneficial result in favor of the consumer of baking-powders.

My new baking-powder can be easily manufactured by thoroughly grinding and intermixing the various salts and amylaceous substances employed. It is, furthermore, sold in the market at a nominal figure.

I am aware that the tartrate of alumina and tartrate of ammonia have been used separately in baking-powders, and I make no claim to said substances when so used.

Having thus fully described my invention, I claim as new and desire to secure to me by Letters Patent—

A baking-powder composed of an aluminium ammonium tartrate and an alkaline carbonate, combined substantially as described.

In testimony that I claim the foregoing as my invention I have hereto set my hand in the presence of two subscribing witnesses.

CHAS. BLACKING.

Attest:
  MICHAEL J. STARK,
  GUSTAV E. FUHRMANN.